(12) United States Patent
Sampath et al.

(10) Patent No.: US 8,607,102 B2
(45) Date of Patent: Dec. 10, 2013

(54) FAULT MANAGEMENT FOR A PRINTING SYSTEM

(75) Inventors: Meera Sampath, Chennai (IN); Markus P. J. Fromherz, Palo Alto, CA (US); Dusan G. Lysy, Fairport, NY (US); Rajinderjeet Singh Minhas, Churchville, NY (US); Naveen Sharma, Fairport, NY (US); William Joseph Hannaway, Webster, NY (US); Wheeler Ruml, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1846 days.

(21) Appl. No.: 11/522,171

(22) Filed: Sep. 15, 2006

(65) Prior Publication Data

US 2008/0126860 A1    May 29, 2008

(51) Int. Cl.
G06F 11/00    (2006.01)

(52) U.S. Cl.
USPC ........................................................ 714/46

(58) Field of Classification Search
USPC ........................................................ 714/46
See application file for complete search history.

(56) References Cited

U.S. PATENT DOCUMENTS

| | | | |
|---|---|---|---|
| 4,579,446 A | 4/1986 | Fujino et al. | |
| 4,587,532 A | 5/1986 | Asano | |
| 4,836,119 A | 6/1989 | Siraco et al. | |
| 5,004,222 A | 4/1991 | Dobashi | |
| 5,008,713 A | 4/1991 | Ozawa et al. | |
| 5,080,340 A | 1/1992 | Hacknauer et al. | |
| 5,095,342 A | 3/1992 | Farrell et al. | |
| 5,159,395 A | 10/1992 | Farrell et al. | |
| 5,208,640 A | 5/1993 | Horie et al. | |
| 5,272,511 A | 12/1993 | Conrad et al. | |
| 5,326,093 A | 7/1994 | Sollitt | |
| 5,435,544 A | 7/1995 | Mandel | |
| 5,473,419 A | 12/1995 | Russel et al. | |
| 5,489,969 A | 2/1996 | Soler et al. | |
| 5,504,568 A | 4/1996 | Saraswat et al. | |
| 5,525,031 A | 6/1996 | Fox | |
| 5,557,367 A | 9/1996 | Yang et al. | |
| 5,568,246 A | 10/1996 | Keller et al. | |
| 5,570,172 A | 10/1996 | Acquaviva | |
| 5,596,416 A | 1/1997 | Barry et al. | |
| 5,629,762 A | 5/1997 | Mahoney et al. | |

(Continued)

OTHER PUBLICATIONS

Morgan, P.F., "Integration of Black Only and Color Printers", Xerox Disclosure Journal, vol. 16, No. 6, Nov./Dec. 1991, pp. 381-383.

(Continued)

Primary Examiner — Amine Riad
(74) Attorney, Agent, or Firm — Fay Sharpe LLP

(57) ABSTRACT

A printing system includes a plurality of print media processing modules which transfer print media therebetween during printing and a fault management agent associated with each of the modules for acquiring fault-related data from the respective processing module. A fault management system is in communication with the fault management agents and receives fault-related data from the fault management agents. The fault management system processes the fault related data to identify faults in the system, such as when a first of the processing modules is a cause of fault-related data acquired in a second of the processing modules. When a fault is identified, a reconfiguration agent may reconfigure the printing system to mitigate an impact of at least one of the identified faults.

28 Claims, 4 Drawing Sheets

(56) References Cited

U.S. PATENT DOCUMENTS

| | | | |
|---|---|---|---|
| 5,710,968 A | 1/1998 | Clark et al. | |
| 5,778,377 A | 7/1998 | Marlin et al. | |
| 5,884,910 A | 3/1999 | Mandel | |
| 5,923,834 A * | 7/1999 | Thieret et al. | 714/25 |
| 5,995,721 A | 11/1999 | Rourke et al. | |
| 6,059,284 A | 5/2000 | Wolf et al. | |
| 6,125,248 A | 9/2000 | Moser | |
| 6,241,242 B1 | 6/2001 | Munro | |
| 6,297,886 B1 | 10/2001 | Cornell | |
| 6,341,773 B1 | 1/2002 | Aprato et al. | |
| 6,384,918 B1 | 5/2002 | Hubble, III et al. | |
| 6,450,711 B1 | 9/2002 | Conrow | |
| 6,476,376 B1 | 11/2002 | Biegelsen et al. | |
| 6,476,923 B1 | 11/2002 | Cornell | |
| 6,493,098 B1 | 12/2002 | Cornell | |
| 6,537,910 B1 | 3/2003 | Burke et al. | |
| 6,550,762 B2 | 4/2003 | Stoll | |
| 6,554,276 B2 | 4/2003 | Jackson et al. | |
| 6,577,925 B1 | 6/2003 | Fromherz | |
| 6,607,320 B2 | 8/2003 | Bobrow et al. | |
| 6,608,988 B2 | 8/2003 | Conrow | |
| 6,612,566 B2 | 9/2003 | Stoll | |
| 6,612,571 B2 | 9/2003 | Rider | |
| 6,621,576 B2 | 9/2003 | Tandon et al. | |
| 6,633,382 B2 | 10/2003 | Hubble, III et al. | |
| 6,639,669 B2 | 10/2003 | Hubble, III et al. | |
| 6,819,906 B1 | 11/2004 | Herrmann et al. | |
| 6,925,283 B1 | 8/2005 | Mandel et al. | |
| 6,959,165 B2 | 10/2005 | Mandel et al. | |
| 6,973,286 B2 | 12/2005 | Mandel et al. | |
| 7,024,152 B2 | 4/2006 | Lofthus et al. | |
| 2002/0078012 A1 | 6/2002 | Ryan et al. | |
| 2002/0103559 A1 | 8/2002 | Gartstein | |
| 2003/0077095 A1 | 4/2003 | Conrow | |
| 2004/0085561 A1 | 5/2004 | Fromherz | |
| 2004/0085562 A1 | 5/2004 | Fromherz | |
| 2004/0088207 A1 | 5/2004 | Fromherz | |
| 2004/0150156 A1 | 8/2004 | Fromherz et al. | |
| 2004/0150158 A1 | 8/2004 | Biegelsen et al. | |
| 2004/0153983 A1 | 8/2004 | McMillan | |
| 2004/0216002 A1 | 10/2004 | Fromherz et al. | |
| 2004/0225391 A1 | 11/2004 | Fromherz et al. | |
| 2004/0225394 A1 | 11/2004 | Fromherz et al. | |
| 2004/0247365 A1 | 12/2004 | Lofthus et al. | |
| 2005/0141013 A1 * | 6/2005 | Kikuchi et al. | 358/1.14 |
| 2006/0033771 A1 | 2/2006 | Lofthus et al. | |
| 2006/0039728 A1 | 2/2006 | deJong et al. | |
| 2006/0066885 A1 | 3/2006 | Anderson et al. | |
| 2006/0067756 A1 | 3/2006 | Anderson et al. | |
| 2006/0067757 A1 | 3/2006 | Anderson et al. | |
| 2006/0114313 A1 | 6/2006 | Moore | |
| 2006/0114497 A1 | 6/2006 | Anderson et al. | |
| 2006/0115284 A1 | 6/2006 | Grace et al. | |
| 2006/0115287 A1 | 6/2006 | Roof | |
| 2006/0115288 A1 | 6/2006 | Roof | |
| 2006/0132815 A1 | 6/2006 | Lofthus et al. | |

OTHER PUBLICATIONS

Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/051,817, filed Feb. 4, 2005, Moore et al.
U.S. Appl. No. 11/070,681, filed Mar. 2, 2005, Viturro et al.
U.S. Appl. No. 11/089,854, filed Mar. 25, 2005, Clark et al.
U.S. Appl. No. 11/090,498, filed Mar. 25, 2005, Clark.
U.S. Appl. No. 11/090,502, filed Mar. 25, 2005, Mongeon.
U.S. Appl. No. 11/095,378, filed Mar. 31, 2005, Moore et al.
U.S. Appl. No. 11/094,998, filed Mar. 31, 2005, Moore et al.
U.S. Appl. No. 11/094,864, filed Mar. 31, 2005, de Jong et al.
U.S. Appl. No. 11/095,872, filed Mar. 31, 2005, Julien et al.
U.S. Appl. No. 11/102,355, filed Apr. 8, 2005, Fromherz et al.
U.S. Appl. No. 11/084,280, filed Mar. 18, 2005, Mizes.
U.S. Appl. No. 11/109,566, filed Apr. 19, 2005, Mandel et al.
U.S. Appl. No. 11/109,558, filed Apr. 19, 2005, Furst et al.
U.S. Appl. No. 11/109,996, filed Apr. 20, 2005, Mongeon et al.
U.S. Appl. No. 11/093,229, filed Mar. 29, 2005, Julien.
U.S. Appl. No. 11/102,899, filed Apr. 8, 2005, Crawford et al.
U.S. Appl. No. 11/102,910, filed Apr. 8, 2005, Crawford et al.
U.S. Appl. No. 11/115,766, filed Apr. 27, 2005, Grace.
U.S. Appl. No. 11/102,332, filed Apr. 8, 2005, Hindi et al.
U.S. Appl. No. 11/136,959, filed May 25, 2005, German et al.
U.S. Appl. No. 11/122,420, filed May 5, 2005, Richards.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.

* cited by examiner

FAULT MANAGEMENT FOR A PRINTING SYSTEM

CROSS REFERENCE TO RELATED PATENTS AND APPLICATIONS

The following patents and applications, the disclosures of each being totally incorporated herein by reference, are mentioned:

U.S. Publication No. US-2006-0114497-A1, Published Jun. 1, 2006, entitled "PRINTING SYSTEM," by David G. Anderson, et al.;

U.S. Publication No. US-2006-0067756-A1, filed Sep. 27, 2005, entitled "PRINTING SYSTEM," by David G. Anderson, et al.;

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. Publication No. US-2006-0033771-A1, published Feb. 16, 2006, entitled "PARALLEL PRINTING ARCHITECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. application Ser. No. 11/051,817, filed Feb. 4, 2005, entitled "PRINTING SYSTEMS," by Steven R. Moore, et al.;

U.S. application Ser. No. 11/069,020, filed Feb. 28, 2004, entitled "PRINTING SYSTEMS," by Robert M. Lofthus, et al.; U.S. Publication No. US-2006-0114313-A1, Published Jun. 1, 2006, entitled "PRINTING SYSTEM," by Steven R. Moore;

U.S. application Ser. No. 11/093,229, filed Mar. 29, 2005, entitled "PRINTING SYSTEM," by Paul C. Julien;

U.S. application Ser. No. 11/095,872, filed Mar. 31, 2005, entitled "PRINTING SYSTEM," by Paul C. Julien;

U.S. application Ser. No. 11/094,864, filed Mar. 31, 2005, entitled "PRINTING SYSTEM," by Jeremy C. deJong, et al.;

U.S. application Ser. No. 11/094,998, filed Mar. 31, 2005, entitled "PARALLEL PRINTING ARCHITECTURE WITH PARALLEL HORIZONTAL PRINTING MODULES," by Steven R. Moore, et al.;

U.S. application Ser. No. 11/137,251, filed May 25, 2005, entitled "SCHEDULING SYSTEM," by Robert M. Lofthus, et al.;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/341,733, filed Jan. 27, 2006, entitled "PRINTING SYSTEM AND BOTTLENECK OBVIATION," by Kristine A. German;

U.S. application Ser. No. 11/359,065, filed Feb. 22, 2005, entitled "MULTI-MARKING ENGINE PRINTING PLATFORM," by Martin E. Banton;

U.S. application Ser. No. 11/378,040, filed Mar. 17, 2006, entitled "FAULT ISOLATION OF VISIBLE DEFECTS WITH MANUAL MODULE SHUTDOWN OPTIONS," by Kristine A. German, et al.;

U.S. application Ser. No. 11/403,785, filed Apr. 13, 2006, entitled "MARKING ENGINE SELECTION," by Martin E. Banton et al.;

U.S. application Ser. No. 10/686,844, filed Oct. 16, 2003, now US Publication No. 20040111315, published Jun. 10, 2004, entitled "DEVICE MODEL AGENT," by Naveen Sharma, et al.;

U.S. application Ser. No. 11/156,778, filed Jun. 20, 2005, entitled "PRINTING PLATFORM," by Joseph A. Swift;

U.S. application Ser. No. 11/102,355, filed Apr. 8, 2005, entitled "COMMUNICATION IN A DISTRIBUTED SYSTEM," by Markus P. J. Fromherz, et al.;

U.S. application Ser. No. 11/102,910, filed Apr. 8, 2005, entitled "COORDINATION IN A DISTRIBUTED SYSTEM," by Lara S. Crawford, et al.;

U.S. application Ser. No. 11/109,996, filed Apr. 20, 2005, entitled "PRINTING SYSTEMS," by Michael C. Mongeon, et al.;

U.S. application Ser. No. 10/855,936, filed May 27, 2004, Publication No. 20050278303, published Dec. 15, 2005, entitled "SYSTEM AND METHOD FOR PRODUCTION PLANNING UTILIZING ON-LINE STATE-SPACE PLANNING," by Wheeler Ruml, et al.;

U.S. application Ser. No. 10/424,620, filed Apr. 28, 2003, Publication No. 20040216002, published Oct. 28, 2004, entitled "PLANNING AND SCHEDULING FOR FAILURE RECOVERY SYSTEM AND METHOD," by Markus P. J. Fromherz, et al.;

U.S. application Ser. No. 10/424,661, filed Apr. 28, 2003, Publication No. 20040225394, published Nov. 11, 2004, entitled "PREDICTIVE AND PREEMPTIVE PLANNING AND SCHEDULING FOR DIFFERENT JOB PRIORITIES SYSTEM AND METHOD," by Markus P. J. Fromherz, et al.;

U.S. application Ser. No. 10/924,458, filed Aug. 23, 2004, Publication No. 20060039026, published Feb. 23, 2006, entitled "PRINT SEQUENCE SCHEDULING FOR RELIABILITY," Robert M. Lofthus, et al.; and U.S. application Ser. No. 10/284,560, filed Oct. 30, 2002, Publication No. 20040085561, published May 6, 2004, entitled "PLANNING AND SCHEDULING RECONFIGURABLE SYSTEMS WITH REGULAR AND DIAGNOSTIC JOBS," by Markus P. J. Fromherz, et al.

BACKGROUND

Integrated printing systems, such as those referred to as "parallel" printing systems and "cluster" printing systems, have been developed in which several marking engines are under the control of a common control system so that a print job may be split among marking engines which are capable of executing the print job. Each marking engine in the integrated system is capable of marking print media, such as paper, with a marking medium such as ink or toner and, in the case of toner, fusing the toner to the print media. The marking engines may differ in that they run at different speeds, print color or monochrome, and/or provide different levels of print quality, higher print quality often being associated with a higher per page cost.

In some integrated systems, two or more marking engines may each execute a portion of the print job. For example, in duplex (two sided) printing, one marking engine may print the first side of each sheet while a second marking engine prints the second side. In simplex (single sided) printing, first and second marking engines may print alternate sheets. In some print jobs, two marking engines may apply marking media to the same side of the sheet, such as for overprinting. The two or more marking engines may be linked by a common paper path to an output device, such as a finisher, where the portions of the executed print job are combined. In the event that one of the marking engines malfunctions, the control system may reroute the print job, or print job portion, designated for that marking engine to another marking engine which is capable of printing the print job, while the malfunctioning marking engine undergoes repair or is replaced. In some cases, the marking engine may be used for printing those print jobs which are not compromised by the malfunction and may undergo repair when not in use.

Such an integrated system with built in redundancy has the advantage of high availability in that the print job is completed, although in some cases, this may be achieved in a less than optimal manner. For example, the job may be printed at a lower output speed, or at higher per page cost, or at a lower print quality, depending on the marking engine(s) that are currently available, the requirements of other print jobs in the queue, and the customer's preferences.

One problem in integrated systems is that the system relies on fault detection by the individual marking engines. Each marking engine is equipped with sensors which detect and log performance characteristics, such as timing of various events, outputs of feedback control loops, toner properties, voltages and currents, developed toner mass on photoreceptors, print quality and registration, environmental conditions, actuator values, and the like. Additionally, the prior systems also record faults and error counter values. A marking engine may detect a fault which did not, in fact, originate in the marking engine. Rather, the fault may have occurred upstream in the common paper path, for example, in an upstream marking engine. The marking engine reports the detected fault to a scheduling component of the printing system. The scheduling system may attribute the detected fault to the reporting marking engine and may make scheduling decisions which are based on the erroneous information.

INCORPORATION BY REFERENCE

The following references, the disclosures of which are incorporated by reference in their entireties, relate to what have been variously called "tandem engine" printers, "parallel" printers, or "cluster printing" (in which an electronic print job may be split up for distributed higher productivity printing by different printers, such as separate printing of the color and monochrome pages), and "output merger" or "interposer" systems: U.S. Pat. No. 5,568,246 to Keller, et al., U.S. Pat. No. 4,587,532 to Asano, U.S. Pat. No. 5,570,172 to Acquaviva, U.S. Pat. No. 5,596,416 to Barry, et al.; U.S. Pat. No. 5,995,721 to Rourke et al; U.S. Pat. No. 4,579,446 to Fujino; U.S. Pat. No. 5,489,969 to Soler, et al.; a 1991 "Xerox Disclosure Journal" publication of November-December 1991, Vol. 16, No. 6, pp. 381-383 by Paul F. Morgan; and a Xerox Aug. 3, 2001 "TAX" publication product announcement entitled "Cluster Printing Solution Announced."

U.S. Pat. No. 5,701,557 to Webster, et al. describes an image processing apparatus with a controller and plural modules and a method to define a configuration of the image processing machine.

U.S. Pat. No. 6,856,411 to Purvis, et al. discloses a scheduler for picking an itinerary in a printing machine to schedule the processing of sheets through several modules of the printing machine. The scheduler uses hard "must have" policies and soft "desired" policies to select an itinerary.

U.S. Pat. No. 5,696,893 to Fromherz, et al. describes a method for modeling a printing machine specifying a structure model with its physical and software interface and internal resource requirements, and a behavior model to describe capabilities of a component with its description of work units, transformation of work units, timed events, resource allocations, constraints and restrictions. The disclosures of all of these patents are incorporated herein by reference in their entireties.

BRIEF DESCRIPTION

In accordance with one aspect of the exemplary embodiment disclosed herein, a printing system includes a plurality of print media processing modules which transfer print media therebetween during printing. A fault management agent is associated with each of the modules for acquiring fault-related data from the respective processing module. A fault management system (FMS) is in communication with the fault management agents. The FMS receives fault-related data from each of the fault management agents. The fault management system processes the fault related data from the fault management agents to identify faults in the printing system.

In accordance with another aspect, a method for management of faults in a printing system includes acquiring fault-related data by a plurality of fault management agents, each of the fault management agents being associated with a print media processing module in the printing system, communicating the fault-related data to a fault management system, processing the fault-related data to identify faults that exist in the printing system, and reconfiguring the printing system to mitigate an impact of at least one of the identified faults.

In accordance with another aspect, a method for management of faults in a job processing system includes acquiring first fault-related data from a first processing module in a job processing system, acquiring second fault-related data from a second processing module in the job processing system, and processing a combination of the acquired first and second fault related data to identify when a first of the processing modules is a cause of fault-related data acquired in a second of the processing modules.

In accordance with another aspect, a fault management system includes a plurality of fault management agents, each acquiring fault-related data for identifying faults in an associated processing module of an integrated system. A fault detection agent analyses fault-related data from the plurality of fault management agents. A fault diagnosis agent identifies when a first processing module is a source of a fault detected by a second processing module, based on the analyzed fault-related data. A reconfiguration agent reconfigures the integrated system to modify usage of the first processing module when the fault diagnosis agent identifies the first processing module as the source of a fault. Alternatively, one or more marking engines may interact to produce a system-level fault.

DETAILED DESCRIPTION

Figure 1:
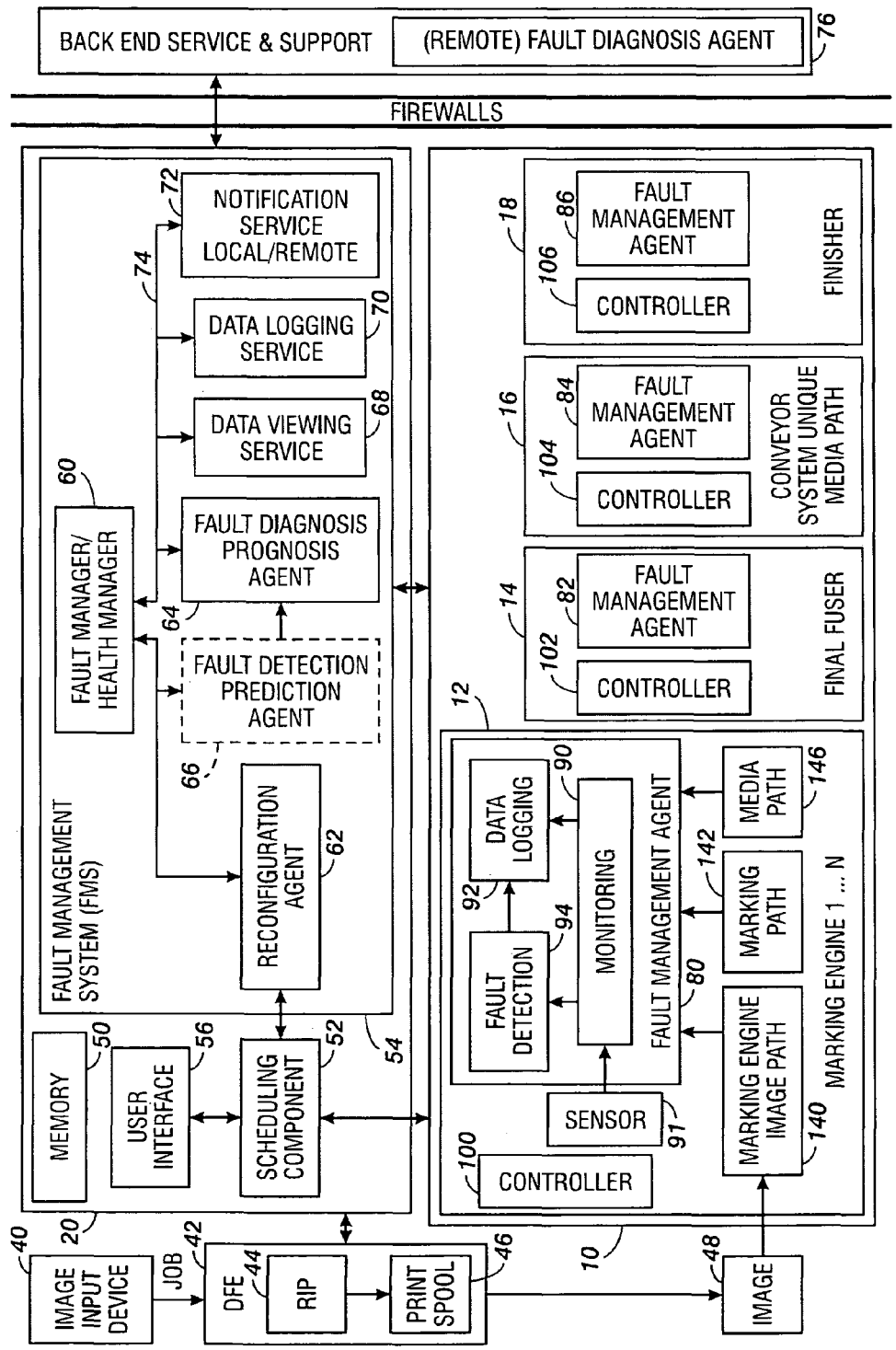
FIG. 1 is a functional block diagram of a printing system in accordance with a first aspect of the exemplary embodiment.

Aspects of the exemplary embodiment relate to a printing system and to a method of printing. In one aspect, the printing system includes a control system and a plurality of processing modules, such as one or more marking engines, and finishers, and a conveyor system, in communication with the control system. The conveyor system provides a common print media path which links the other processing modules whereby print media travels between an upstream processing module and a downstream processing module. The control system receives information from the processing modules and uses the information to identify (generally, detect and if possible, diagnose) faults. In one embodiment, the control system identifies a particular processing module (and in some cases, a particular component of the processing module) as a source of a fault in the system. The control system (or more specifically, a fault management system within the control system) may utilize information from a plurality of the processing modules in identifying the particular processing module as the source of the fault, which may lead to a processing module other than one reporting a fault condition being identified as the source of the fault. The control system may also utilize information provided by system level sensors and controllers and users of the system in identifying faults. The control system may then reconfigure the printing system, in accordance with the identified fault, in order to mitigate impacts of the faults, e.g., by reducing usage of the fault-causing processing module.

In another aspect, the method includes, receiving information including fault-related data from a plurality of processing modules in a job processing system such as a printing system, determining whether a fault exists in the printing system, identifying at least one source of the fault, and taking the identified source of the fault into account in reconfiguring the printing system. In the exemplary method, fault related data may also be received from one or more of system level sensors, system level controllers, and system users.

The exemplary system has advantages in that it yields improvements to the availability of a printing system. High availability is ensured, in the exemplary embodiment, not only through adequate redundancy, but also through effective management of the redundancy by an effective fault management system.

Redundancy is provided, for example, by equipping the printing system with processing modules and/or components thereof which are capable of performing the same function, such as multiple black or color marking engines. However, since redundancy incurs added costs, e.g., in maintaining and repairing the additional modules, in order to fully utilize the benefits of redundancy it is desirable to manage the redundancy effectively. In the present system, managing the redundancy effectively depends on a sound fault management strategy that enables fault tolerant system behavior by appropriately redirecting/reconfiguring redundant resources in a dynamic manner as faults occur. This enhances the overall system availability by providing means for accurate, timely fault diagnosis and mechanisms for quick recovery and restoration.

The redundancy provided by the printing system may be either physical redundancy, in which case an alternate component is identical or similar physically to the failed component. Or, it may be functional redundancy, wherein the alternate component is capable of providing the same functionality as the failed component. Redundancy may alternatively or additionally be provided in the form of software, or in the form of time-based or information-based redundancy.

The "printing system" can be a digital copier or printer, bookmaking machine, facsimile machine, multi-function machine, or the like. The exemplary printing system includes a plurality of marking engines, each of which apply a marking material, such as ink or toner, to a print medium, such as sheets of paper, to form images on the print media, generally referred to as printing.

"Print jobs" generally include a plurality of digital "pages" to be rendered as one or more copies on a set of associated sheets of print media, each page, when rendered, constituting the front or back side of a sheet. The pages of a print job may arrive from a common paper source and, when rendered, be assembled at a common output destination, such as a finisher.

The "finisher" can be can be any post-printing accessory device, such as a tray or trays, sorter, mailbox, inserter, interposer, folder, stapler, stacker, hole puncher, collater, stitcher, binder, envelope stuffer, postage machine, or the like.

Exemplary faults which may cause the controller to reconfigure the printing system include those causing image defects (e.g., streaks, bands, spots), image quality variances (e.g., color, gloss variations from predefined target values), registration problems (between multiple images or image on sheet registration), sheet damage (e.g., curling, tearing, crumpling jams), end-of-life of components, and the like.

Reconfiguring the printing system may include one or more of redirecting print jobs to another marking engine, utilizing a different media source from that specified by the print job or default media source, utilizing a physically or functionally equivalent redundant component of a processing module when a component of that processing module is identified as being faulty, reducing usage of one or more of the processing modules, e.g., restricting usage to specific tasks only, instructing one or more of the modules to modify operating parameters, modifying a model of the printing system which includes the general capabilities and status of the system components, including the current status and a predicted status of the modules, and the like. In some cases, the control system may seek user input in selecting an acceptable reconfiguration.

Figure 2:
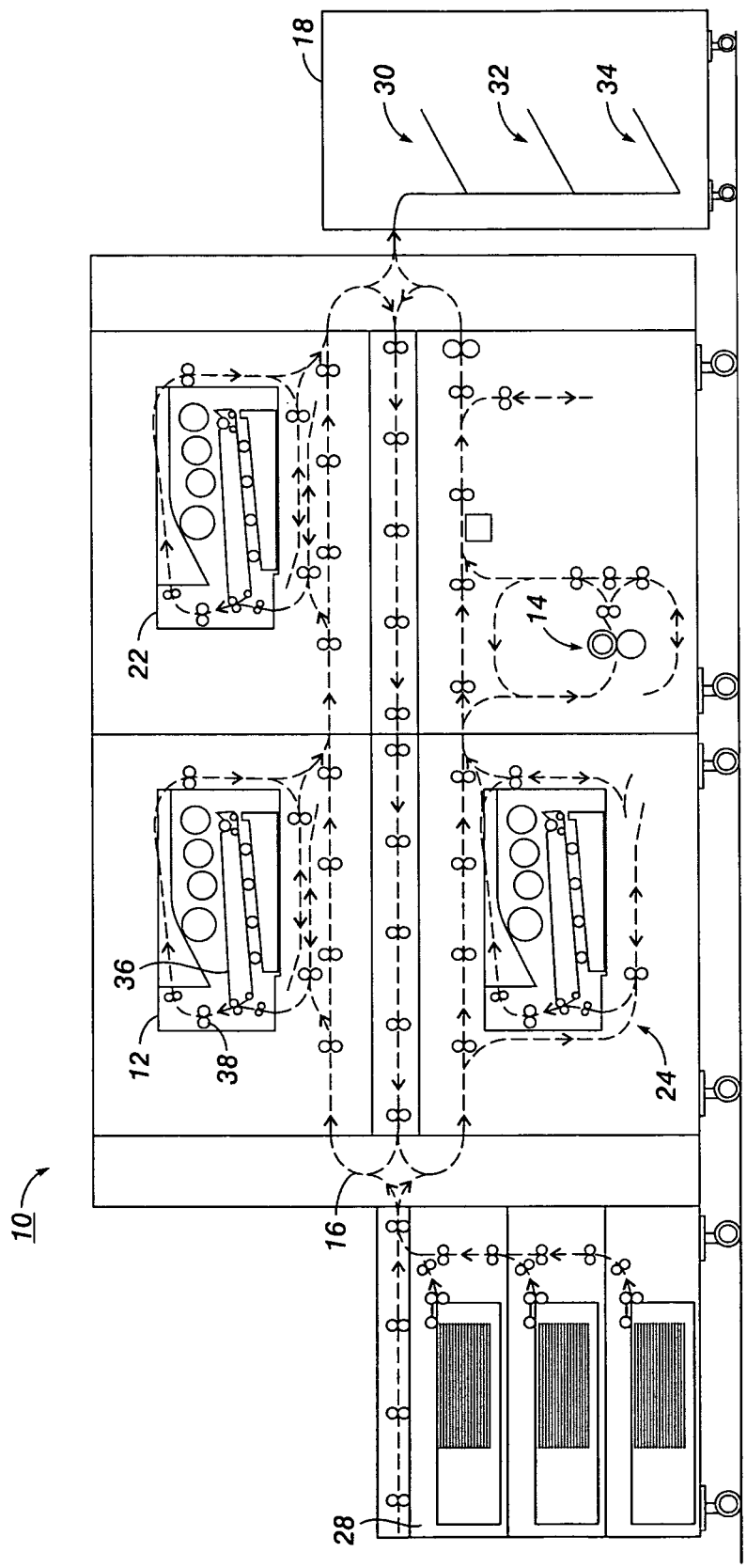
FIG. 2 is a side elevational view of an exemplary printing system having the functionality illustrated in FIG. 1.

With reference to FIG. 1, an exemplary printing system 10 capable of detection of faults includes a plurality of print media processing modules 12, 14, 16, 18 and a print station interface platform 20, which serves as a control system, in communication with the processing modules. The illustrated processing modules include a marking engine 12 (representative of a plurality of marking engines 1-N, where N can be, for example, 2, 4, 6, 8, or more); an optional final fusing component 14, a print media conveyor system 16, and a output destination 18, such as a finisher. Modules 12, 14, 18 are interconnected by the print media conveyor system 16. FIG. 2 illustrates one way in which the modules may be interconnected, showing three marking engines 12, 22, 24 by way of example, although it is to be appreciated that many other arrangements exist.

In some embodiments, one or more of the processing modules 12, 14, 18, 22, 24 (or components thereof) are removable for replacement and/or repair, while leaving the conveyor system 16 substantially intact. In this manner, for example, the functional portion can be removed for repair, or can be replaced to effectuate an upgrade or modification of the printing system 10. The printing system 10 remains operational with the functional portion of the processing module 12, 14, 18, 22, or 24 removed, broken, or otherwise unavailable, albeit with loss of the availability in the printing system 10.

Providing at least two marking engines 12, 22, 24 typically provides enhanced features and capabilities for the printing system, since marking tasks can be distributed amongst the at least two marking engines. Some or all of the marking engines 12, 22, 24 may be identical to provide improved productivity and also to provide redundancy and availability through parallel printing. Alternatively or additionally, some or all of the marking engines 12, 22, 24 may be different to provide different capabilities. For example, the marking engines 12, 22 may be monochrome engines, such as black (K) marking engines, while the marking engine 24 may be a multi-color, e.g., a process color (P) marking engine.

The illustrated marking engines 12, 22, 24 employ xerographic printing technology, in which an electrostatic image is formed and coated with a toner material, and then transferred and fused to paper or another print medium by application of heat and/or pressure. However, marking engines employing other printing technologies can be provided as processing units, such as marking engines employing ink jet transfer, thermal impact printing, or the like.

The final fuser 14 provides a secondary fusing to sheets which have been at least partially fused by a marking engine 12, 22, 24, for example, to increase the gloss of sheets or to reduce gloss variations between sheets that have been fused by different marking engines. The final fuser may be similarly configured to the fusers in the marking engines or may be different. Fusers of this type are disclosed, for example, in above-mentioned copending application Ser. Nos. 10/999,450 and 11/235,979, incorporated herein by reference.

The conveyor system 16 is fed with print media by a print media source 28. The illustrated source 28 is a high capacity feeder which includes several print media sources such as trays, which are connected with the print media conveyor system 16 to provide selected types of print media to all of the marking engines. In other embodiments, one or more of the marking engines may include its own dedicated print media source. The print media can be substantially any type of medium upon which one or more of the marking engines 12, 22, 24 can print, such as paper, card, or plastic.

The print media conveyor 16 is controllable to acquire sheets of a selected print medium from the print media source 28, transfer each acquired sheet to one or more of the installed marking engines 12, 22, 24 to perform selected marking tasks, and then transfer each sheet to the finisher 18 to perform finishing tasks. The finisher 18 includes one or more print media output destinations 30, 32, 34, herein illustrated by trays. While three output destinations 30, 32, 34 are illustrated, the printing system 10 may include one, two, three, four, or more print media output destinations.

The print media conveyor system 16 includes a plurality of paper paths and associated drive elements, such as rollers, spherical balls, or air jets, which convey the print media along the paths and may include diverters, inverters, interposers, and the like, as known in the art. The paths may be in the form of loops (the direction of paper travel being illustrated by direction arrows in FIG. 2) which allow print media from one marking engine to be delivered to another marking engine for duplex printing (two sided printing) or overprinting (printing on the same side of the sheet) and optionally to the final fuser 14. In the illustrated printing system 10, print media which has been printed by one marking engine can be routed to any other marking engine and/or the final fuser 14. Additionally, bypass pathways allow one or more of the marking engine to be bypassed. In other configurations (not shown) the routing may be more limited. Printing systems of this type are described, for example, in above-mentioned copending application Ser. Nos. 10/924,458, 10/953,953, 10/999,450, 11/136,959, 11/137,251, 11/137,273, 11/137,634, 11/212,367, 11/235,979, 11/236,099, 11/378,040, and in the references cited therein.

In general, each marking engine 12, 22, 24 includes various subsystems for forming an image, transferring the image to a sheet of paper, and fusing the image to attach the image more permanently to the print media. In the case of a xerographic device, the marking engine typically includes a charge retentive surface, such as a rotating photoreceptor 36 in the form of a belt or drum. The images are created on a surface of the photoreceptor. Disposed at various points around the circumference of the photoreceptor 36 are the xerographic subsystems, which include a cleaning device, a charging station for each of the colors to be applied (one in the case of a monochrome marking engine, four in the case of a CMYK printer), such as a charging corotron, an exposure station, which forms a latent image on the photoreceptor, such as a Raster Output Scanner (ROS) or LED bar, a developer unit, associated with each charging station for developing the latent image formed on the surface of the photoreceptor by applying a toner to obtain a toner image, a transfer unit, such as a transfer corotron, transfers the toner image thus formed to the surface of a print media substrate, such as a sheet of paper. A fuser 38 fuses the image to the sheet. The fuser 38 generally applies at least one of heat and pressure to the sheet to physically attach the toner and optionally to provide a level of gloss to the printed media. In any particular embodiment of an electrophotographic marking engine, there may be variations on this general outline, such as additional corotrons, cleaning devices, or, in the case of a color printer, multiple developer units. The xerographic subsystems and fuser are controlled by a marking engine controller such as a CPU, which includes actuators for controlling each of the subsystems and fuser. The marking engine controller is linked to the printing system control system 20 and may be also linked to other known components, such as a memory, a marking cartridge platform, a marking driver, a function switch, a self-diagnostic unit, all of which can be interconnected by a data/control bus.

The printing system 10 executes print jobs. Print job execution involves printing images, such as selected text, line graphics, photographs, magnetic ink character recognition (MICR) notation, and the like on front, back, or front and back sides or pages of one or more sheets of paper or other print media. Some sheets may be left completely blank. Some sheets may have both color and monochrome images. Execution of the print job may also involve collating the sheets in a certain order. Still further, the print job may include folding, stapling, punching holes into, or otherwise physically manipulating or binding the sheets. The printing, finishing, paper handing, and other processing operations that can be executed by the printing system 10 are determined by the capabilities of the paper source 28, marking engines 12, 22, 24, final fuser 14, where present, and finisher 18 of the printing system 10. These capabilities may increase overtime due to addition of new processing units or upgrading of existing processing units. The capabilities may also decrease over time due to failure or removal of one or more processing units, such as the illustrated removed functional portion of processing unit 16.

Returning to FIG. 1, an image input device 40 supplies the printing system 10 with one or more print jobs to be printed. The image input device can be a built-in optical scanner, which can be used to scan a document such as book pages, a stack of printed pages, or the like, to create a digital image of the scanned document that is reproduced by printing operations performed by the printing system 10. Alternatively, the print job can be electronically delivered to the printing system 10 via a wired or wireless connection to a digital network that interconnects, for example, personal computers or other digital image input devices. It is contemplated that print jobs may be delivered to the printing system 10 in other ways, such as by using an optical disk reader (not illustrated) or USB port built into the printing system 10, or using a dedicated computer connected only to the printing system 10.

The incoming print jobs may be processed, in conventional fashion, by a digital front end (DFE) 42 having raster image processing (RIP) and print spooling capabilities 44, 46. Image data 48 from the DFE is sent to a selected marking engine or engines 12 for printing according to a schedule determined by the control system 20.

The illustrated control system 20 includes data processing components for scheduling print jobs and for detection and diagnosis of faults and responding to faults when detected. The various data processing components execute instructions stored in memory 50. In the illustrated embodiment, the data processing components include a scheduling component 52 and a fault management system 54. It is to be appreciated that while several processing components (and sub-components) are illustrated, it is contemplated that the functions of two or more of the processing components/subcomponents may be combined in a single chip or that functions of a single component may be distributed throughout the system 10. The processing components may reside in a single location or be distributed throughout the printing system. Indeed, some of the processing components may be resident in one or more of the marking engines. Some or all of the data processing components, such as components 52, 54, or parts thereof, may be under the control of a common printing system controller (not shown).

The scheduling component 52 identifies one or more marking engines 12, 22, 24 for performing a particular print job and, as the print job reaches the front of the print job queue, plans a route for each page to be printed. The image(s) for the page are then sent to the selected marking engine and the readiness of the selected print media processing modules 12, 14, 16, 18 confirmed. Where the scheduling component 52 has a choice of print media processing modules for effecting printing of a page or pages, the scheduling component 52 determines an appropriate marking engine or combination of marking engines for performing the print job. The scheduling component 52 communicates with the fault management system 54 to identify reconfigurations in the system resulting from any print media processing module failures. In scheduling the print job, the scheduling component may also take into consideration any time constraints, cost constraints, and print quality constraints associated with the print job, as well as other factors, such as maintaining health or efficiency of the marking engines, for example, by maximizing continuous running of a given marking engine (as described, for example, in copending U.S. application Ser. No. 11/137,634) or by interleaving jobs which place stress on a marking engine with jobs which mitigate the stress (as described, for example, U.S. application Ser. Nos. 11/136,959 and 11/137,251). The scheduling component may also take into consideration user preferences, in put, for example, by a user interface 56, such as a touch screen, keyboard, or the like. The user interface allows users to input their preferences to the scheduling component, such as for example which criteria are most important to them—run cost, productivity, etc. This preference will be used in conjunction with the information provided by the fault management system 54 to determine the appropriate schedule.

The illustrated fault management system (FMS) 54 includes a number of sub-components which serve to identify faults in the print media processing modules, provide information on the faults to external support service, and reconfigure the printing system at least in the interim while permanent repairs or replacements are being effected.

In particular, the FMS 54 includes a fault manager 60, a reconfiguration agent 62, a fault diagnosis/prognosis agent 64, which may incorporate or communicate with a fault detection/prediction agent 66, a data viewing service 68, a data logging service 70, and a notification service 72, all of which may be linked by a data/control bus 74. The FMS, or components thereof, may communicate with an external service and support service 76, e.g., via aired or wireless link, such as the internet or a telephone line, for additional fault diagnosis support and repair.

The fault management system 54 serves as an overseer for the processing modules 12, 14, 16, 18 of the printing system. In determining the source of a fault reported by one of the modules, the fault management system takes into account reports from other processing modules to determine the true source of the fault. In particular, each of the processing modules 12, 14, 16, 18 in the printing system includes a fault management agent 80, 82, 84, 86, respectively, in communication with the FMS 54.

The fault management system 54 may also serve as a health management system in that it can accurately predict future failures and can take action to maintain the printing system in a healthy state by reconfiguring the printing system to minimize use of a processing module which is predicted to fail or take other proactive action prior to an actual failure of the module.

The fault management system 54, due to higher processing capabilities, may also run more complex diagnostic analysis than the individual modules are capable of performing. For example, when a processing module 12, 14, 16, 18 detects a fault, using its relatively simple diagnostic capabilities, and reports to the heath management system, the fault management system may run further diagnostics on the data to provide a more accurate analysis of the cause of the fault. These diagnostic tests may be performed while the fault reporting module is continuing to operate.

The fault manager 60 provides overall control of the fault management system. The fault manager may notify the reconfiguration agent when a fault is detected by the fault detection/prediction agent 66 or a diagnosis is made by the diagnosis/prognosis agent. Additionally, or alternatively, the fault manager may communicate with the notification service 72, data logging service 70, and data viewing service 68, as appropriate, to ensure that faults are communicated to an external support service 76, logged, or made available for viewing by a user. While an overall manager 60 is shown, it is also contemplated that the control functions of the fault manager are distributed throughout the fault management system 54.

The centralized fault detection (and prediction) agent 66, working on data provided by the processing modules, identifies that a fault has occurred or is predicted to occur.

The fault diagnosis (and prognosis) agent 64 uses the information provided by the fault detection (and prediction) agent 66, as well as information that is logged and provided by the individual fault management agents 80, 82, 84, 86, to diagnose the root cause of the detected fault or may identify the cause of a fault which is predicted to occur. The exemplary centralized fault diagnosis/prognosis agent 64 receives all logged fault-related data from the fault management agents for the individual system elements. The fault diagnosis (and prognosis) agent 64 provides detailed fault diagnosis/prognosis based on this information and the results of the fault detection agent 66. Some of the logged fault-related data may be collected prior to a print job in which a fault is detected and can be used by the fault diagnosis/prognosis agent 64 in determining the cause of a fault or predicting that the fault will occur. In addition to refining and augmenting the results of the module fault detection and diagnosis, the centralized fault diagnosis agent may be responsible for providing system level diagnosis/prognosis which takes into account interactions between modules.

The fault recovery functionality is provided by the reconfiguration agent 62 that may be responsible for system reconfiguration and redirection when faults are detected. The reconfiguration agent receives, via the fault manager 60, fault, error, and exception data generated by the modules as well as detection and diagnosis results from the central fault management system. The reconfiguration agent 62 allows the system to reschedule a job when a fault is detected. While the reconfiguration is illustrated as being a part of the fault management system, it may alternatively be a component of the scheduling component 52.

As noted above, each of the processing modules 12, 14, 16, 18 in the printing system includes a fault management agent 80, 82, 84, 86. The fault management agent is generally responsible for local monitoring, fault detection, and logging of the status of the module and/or characteristics of the marking materials or print media passing through the module. While specific aspects of the fault management agents may differ, they may have attributes in common. In particular, the fault management agent may include one or more monitoring agents 90 for monitoring module attributes and/or for monitoring substrate/making material characteristics. The monitoring agents 90 may receive data from one or more associated sensors 91. In another embodiment, one or more of the sensors 91 may communicate directly with the fault management agent 80, 82, 84, 86.

As shown in FIG. 1, the fault management agent 80, 82, 84, 86 may also receive direct inputs from the marking engine, such as components which form a part of the image path, marking media path, and print media path, illustrated generally at 140, 142, and 146, respectively. The image path 140 includes the components of the marking engine associated with manipulation of the image prior to marking. The marking media path 142 includes the components of the marking engine associated with forming, transferring and optionally fusing images to print media. The print media path 146 includes those components of the marking engine which are associated with media handling, such as the conveyor system 16, including paper feeder, paper path, and associated drives.

It is to be noted that underlying the operation of the fault management system 54 is a sound sensing infrastructure that supports fault detection and diagnosis. This sensing capability may include both the basic type of sensors used for control purposes as well as additional sensors that provide enhanced diagnostics and prognostics as well virtual sensors (components which record data for other purposes which can be utilized by the fault management system). The sensors 91 may vary depending on the type and sophistication of the processing module 12, 14, 16, 18. For example, in the case of the marking engines, module attribute sensors may detect module attributes, such as fuser roll temperature, nip roller speeds, electrical properties, sheet properties, and the like, while substrate/marking material sensors may detect toner coverage, toner concentration, image quality characteristics, such as gloss, image registration, color rendering, and substrate characteristics, such as paper arrival time, paper curl, paper damage, and the like. Environmental sensors may detect humidity and temperature. Sensors for advanced diagnostics and proactive fault management in the media path may include dedicated decision gate sensors, motor torque sensors, media type sensors, and media property sensors that measure moisture content and resistivity of print media. Such sensors can provide the ability to predict impending shutdowns and proactively shut down a marking engine. Marking path sensors may include full-width array (FWA) sensors located adjacent a portion of the print media path 146, for example, adjacent an intermediate transfer belt to sense properties before or after the image is transferred to the print media, or in a portion of the print media path which is common to all the marking engines.

Additionally, the sensors 91 may include virtual sensors, such as fault counters, error counters, watch-dog timers, and actuators outputs from closed loop control systems within the marking engine. Some examples of actuator signals that can be monitored include a TRC map that is used as an actuator for TRC based control, whose deviations indicate print non-uniformities that can signal impending faults, ROS intensity levels that are used as actuators for banding control, xerographic actuators such as development bias, exposure level, and charge levels, gloss level adjustments, and image correction signals in an image quality controller. The monitoring agent 90 may receive data from one or more of the above-mentioned virtual sensors. For example, faults and errors that are detected at a frequency higher than normal can be indicators of problems in the system, current, or impending, and therefore such virtual sensors are valuable aids for fault detection and fault prediction. Comparisons between similar units in the system can also be useful aids for fault detection.

The fault management agent 80, 82, 84, 86 may also include a data logging component 92, comprising memory for logging sensed information from the sensors 91 on a continuous basis along with time stamps. Additionally, the fault management agent may include a fault detection unit 94 for providing preliminary analysis of the logged information. The preliminary analysis may include detection of a fault in the respective module 12, 14, 16, 18, based on the logged information from that module. The preliminary analysis may also include preliminary diagnosis of the cause of the fault, to the extent possible with the limited information and processing capability which, may be available in the fault detection unit. Fault detection and prediction schemes which may be performed by the fault management agent may include time-out checks, threshold checks, trend and rate analysis output/setting comparisons between similar units in the system, checking the actuator and sensor signals for significant deviations from normal, both in magnitude and in frequency, as well as identifying how frequently various compensation schemes in the print processing module are activated, and how much compensation is required to be provided. Additionally, fault detection and prediction may involve checking the fault counters and error counters for abnormally high values, or a higher than normal rate of change.

The fault management agent 80, 82, 84, 86 thus provides a first level fault detection for the printing system which may be sufficient to enable printing system to perform redirection and reconfiguration, at least on an initial basis, until a more detailed fault detection can be performed by the centralized fault management system 54. The results of the fault detection may also be logged by the logging component 92 in the fault management agent. Thus, in addition to the sensor data (including actuator data), the logging component 92 may log all errors, exceptions, and faults. All of this logged information is generally referred to herein as fault related data.

The fault management agent 54 may communicate with a controller 100, 102, 104, 106 for the module. The controller may be resident in the respective module 12, 14, 16, 18, as illustrated, or be remote therefrom. The controller 100, 102, 104, 106 may adjust settings for the module 12, 14, 16, 18 with which it is associated in response to information from the respective fault management agent 80, 82, 84, 86. For example, the controller 100 for the marking engine 12 may adjust power to the fuser in response to fuser roll temperatures outside a predetermined range or sensed gloss values outside a predetermined range.

The individual fault management agents 80, 82, 84, 86 also communicate information (i.e., some or all of the fault related data) to the FMS 54. The information communicated to the FMS 54 may be in the form of unprocessed, logged, time stamped data, and/or processed data, e.g., information output by the fault detection unit 94 concerning a perceived fault. The information concerning the perceived fault may be a false detection or an incorrect diagnosis since the fault management agent 80, 82, 84, 86 only has information from the processing module with which it is associated on which to base the fault diagnosis and/or may have limited fault diagnosis capabilities or insufficient bandwidth to detect and/or diagnose faults while the module is running.

In general, fault-related data are logged by the fault management agent 80, 82, 84, 86 on a continuous basis along with time-stamped sensor and actuator data and forwarded to the FMS 54. The FMS 54 thus receives fault-related data from a plurality of fault management agents 80, 82, 84, 86.

The exemplary fault management system 54 supports fault detection, fault diagnosis, fault recovery, as well as notification functionalities. For example, the fault detection agent 66 detects that a fault has occurred or is predicted to occur. The centralized fault detection service provided by the fault detection agent 66 augments the fault detection within the individual processing modules 12, 14, 16, 18, e.g., when the modules are not able to provide sufficient fault detection as well as providing fault prediction capabilities. In such cases, the fault management agents may transfer raw sensor data to the centralized fault detection system 54. For example, the fault detection agent 66 may determine that a gloss level in one marking engine is too high and that a paper jam has occurred in a downstream marking engine. In some cases, the agent 66 may predict a fault, for example, the agent 66 may recognize that a fuser in one marking engine is running at too high a temperature which may cause the fuser to fail prematurely. In some cases, the fault detection agent 66 may override the analysis of an individual fault management agent and declare a fault detected by the individual agent as a false detection.

The fault diagnosis prognosis agent 64 processes the fault-related information from the plurality of fault management agents 80, 82, 84, 86 to determine whether a fault in one module 12, 14, 16, 18 is contributing to a perceived fault in another module, downstream. The fault diagnosis prognosis agent 64 includes processing instructions which allow the agent 64 to recognize faults caused by upstream modules. For example, a fuser set at too high a temperature in the marking engine 12 may cause the paper to curl, which is not detected until a paper jam occurs, and is detected by a downstream module 14, 16, 18. If the downstream module is a second marking engine 22, the fault management agent of the second marking engine may incorrectly diagnose the paper jam as being caused by overheating of its own fuser. Similarly, if the media conveyor rollers malfunction, causing the paper to slow down or skew, the paper may arrive too late or skewed at a downstream marking engine, causing misregistration of a second image to occur or paper jamming. The marking engine 12 may detect this as a transport fault or software fault in the marking engine.

In some cases, a processing module may not have sufficient fault detection and diagnosis capabilities in order to uniquely diagnose problems. In a parallel printing system which lacks the exemplary FMS, a processing module, such as a marking engine, may simply indicate a fault and be taken offline by the scheduling component until a service engineer can identify and correct the fault. In the present system, in such situations, the fault diagnosis prognosis agent 64 and/or other components of the fault management system 54 will be called upon to use their resources to diagnose the problem. The centralized fault management system 54 thus facilitates use of relatively inexpensive modules, such as marking engines, by shifting many of the processing functions from the marking engines to the FMS. Where the FMS, with its additional diagnostic capabilities, is able to detect the cause of the fault, the system may be able to correct or mitigate the fault, enabling at least partial operating capability of the faulty module until a repair can be performed or, in some cases, eliminating the need for a service call altogether. Thus, the centralized FMS augments the intelligence of the individual processing modules or provides new intelligence where none exists.

In other cases, a processing module may have a fault that it may not able to detect; for example, because it has limited fault detection capabilities. However, this fault may be detected by a downstream module having greater sensing or processing capabilities. The reporting module may not know where exactly the problem lies but could be reasonably sure that it lies elsewhere. The centralized FMS 54 provides diagnosis for identifying the problem source. In some cases, a fault manifest in a downstream module may result from an upstream problem which is within tolerance and therefore not reported. For example, timing slips within tolerance (referred to as a "soft jam") in the media path in an upstream marking engine may become manifest as a real jam in a downstream marking engine.

In other cases, a processing module may incorrectly identify a fault, for example, by identifying that the processing module has a fault when it does not or misdiagnosing the cause of a fault. Since the central FMS, in general, uses additional data and performs more detailed analysis, it can help validate and augment the results of the individual marking engine fault detection agents, and thereby mitigate the effects of such false positives and false negatives. For example, if an isolated unit thought to be faulty by the fault detection agent is found to be indeed faulty after detailed diagnosis, the system will continue to operate with the newly deployed resources, whereas, if it is found to be fully functional by the FMS, the (wrongly) isolated unit can be put back in service.

In another instance, the fault diagnosis and prognosis agent 64 may process the fault-related information from the plurality of fault management agents 80, 82, 84, 86 to determine whether a perceived fault in one processing module 12, 14, 16, 18 is caused by another module, upstream of the reporting module, which by itself may lack the sensing or processing capabilities to detect its fault. For example, a fuser set at too high a temperature in the marking engine 12 may cause the paper to curl, which is not detected until a paper jam occurs, and is detected by a downstream module 14, 16, 18. If the downstream module is a second marking engine 22, the fault management agent of the second marking engine may incorrectly diagnose the paper jam as being caused by overheating of its own fuser.

In some cases, an upstream processing module may have sufficient fault detection capabilities but the problem that originates in this processing module may not be reported as it may be within tolerances. For example, timing slips within tolerance (referred to as a "soft jam") in the media path in an upstream marking engine caused by media conveyor rollers malfunction may cause the paper to slow down or skew. The paper may arrive too late or skewed at a downstream marking engine. This may cause an actual paper jam or misregistration of a second image to occur in the downstream marking engine. The downstream processing module may detect this as a transport fault or software fault within itself.

In other cases, the fault diagnosis and prognosis agent 64 detects an overall system fault, such as an image quality fault which is not caused by a single processing module, but rather may arise when several processing modules, in combination, contribute to the fault. For example, unsatisfactory image quality during overprinting may be detected and its cause identified by the FMS.

In all these cases, the fault diagnosis and prognosis agent 64 may correctly diagnose the problem by analyzing the combined data received from the multiple marking engines. It is to be appreciated that the non-faulty, downstream module that reports the fault that originated upstream may not always report an erroneous fault within itself; the downstream module may not be sufficiently intelligent to know where exactly the problem lies but could be reasonably sure that it lies elsewhere. In these instances too, the centralized FMS 54 may identify the correct source of the problem.

In other cases, the centralized FMS 54 may act in conjunction with the scheduling component and/or other centralized components, such as a centralized system level sensors and actuators, such as an image quality sensor and image quality controller (as described below with reference to FIG. 3), to perform system level diagnostic tests to identify faults. This may provide diagnosis of a system level fault.

The FMS 54 may perform diagnostics while one or more of the processing modules are shut down, run in a partially operational mode, or run in a suitable mode for performing diagnostic tests. This may enable the faulty module to be brought back on line more quickly and without shutting the entire system down to run diagnostic tests. Modules which do not themselves have sufficient bandwidth for both operation and diagnostics can thus be run in at least a low capability mode using the diagnostic capabilities of the FMS to determine the fault. During this time, the rest of the system need not be shut down but may operate in a low productivity mode.

The reconfiguration agent 62 is responsible for determining the system reconfiguration and redirection schema when faults are detected. The reconfiguration agent receives information on the faults detected/diagnosed by the individual printing system modules as well as detection and diagnosis results from the central fault management system FMS. The reconfiguration agent 62 may enable the printing system to reschedule upcoming jobs and also the current job when a fault is detected. Reconfiguring the printing system may include one or more of: redirecting print jobs to another marking engine or another media source, switching over to a physically or functionally redundant sub-system module when one is faulty, or restricting use of a module for specific tasks only. It may also involve instructing one or more of the modules to modify operating parameters. The reconfiguration agent 62 determines which of these action or actions are to be taken when a fault is detected. While the reconfiguration agent is illustrated as being a part of the fault management system, it may alternatively be a component of the scheduling component 52 as discussed below with reference to FIG. 3.

The status of the operating modules, as determined by the fault detection agent 66 and fault diagnosis agent 64, as well as the recommendations by the reconfiguration agent 62, are communicated to the scheduling component 52, so that the reconfiguration actions can be effected by the printing system 10. The communicated information may alternatively or additionally be incorporated into a model of the printing system as described, for example, in U.S. Pat. No. 5,696,893 to Fromherz, et al., which is incorporated herein by reference, in its entirety. The model is accessed by the scheduling component 52 to gain information on the status of the operational modules in order to make scheduling decisions. The inclusion of the FMS 54 in the control system 20 enables the scheduling component 52 to function more efficiently in that the scheduling component 52 receives fault information not only from the individual processing modules, as may be the case in a system lacking the FMS, but it also receives more accurate diagnostic information and reconfiguration information from the FMS which makes the re-planning more effective.

The data logging service 70 continuously logs the data received from the processing modules as well as the fault detection agent 66, the fault diagnosis agent 64, and the reconfiguration agent 62. The data viewing service 68 allows a user to review the logged data, either locally or remotely. The notification service 72 communicates with the external service 74, e.g., via the internet or phone line. The notification service may communicate the results of the diagnosis, the appropriate repair actions needed, or to invoke more sophisticated diagnosis capabilities than are available in the FMS which may be provided by the external service.

The fault manager 60 provides overall control of the fault management system and may perform the following functions: (i) coordinate the operation of the various components in the centralized fault management system, as well as the module fault management agents 80, 82, 84, 86; and (ii) convey the results of the centralized detection and diagnosis services 64, 66 and the reconfiguration agent 62 (where separate from the scheduling component) to the scheduling component 52.

In addition to passive collection of data, the FMS may have the capability to initiate the collection of specific data which will be used in identifying a fault. For example, the FMS may run system level tests in which specific marking engines may be queried and exercised in specific ways for diagnostic purposes, such as by running a set of marking engines to complete a test print job or by testing the capability of a processing module in isolation from other modules, i.e., without interactions of the other processing modules. These tests may be initiated by the fault manager 60 or by a separate printing system controller (not shown) at the request of the FMS.

The FMS may override a processing module's request to go off-line when the FMS determines that the processing module has incorrectly attributed a fault to that processing module.

The FMS may directly request that a processing module goes off line even when the processing module has not itself detected a fault. This may occur, for example, when the processing module does not have the capability itself to shut itself off under failure, or, when the fault manager 60 foresees a problem in a processing module that is not yet perceived by the processing module. For example, the FMS may determine that it is more appropriate to shut the processing module down rather than to redirect jobs to other processing modules, e.g., for power saving, long term health maintenance of the processing module, prevention of faults form propagating from one module to another module, or other reasons.

The FMS may also request a temporary capability change in a marking engine for diagnostic purposes. For example, it may be desirable operate at a higher speed for the next job. The FMS may also request the scheduling component 52 to generate single (or standalone) capabilities rather than complete itineraries, primarily for diagnostic purposes. For example, the scheduling component 52 may be requested to send a sheet through a processing module in order to verify whether or not the module is able to detect faults.

The FMS enables fault diagnosis when the system is running a print job. For example, the FMS can operate when an individual machine is down but the system as a whole runs in a low productivity mode.

The FMS 54 may also serve as a health management system in that it can accurately predict future failures and use this information, along with the usage history and failure history of printing system components, to determine appropriate actions for maintaining the printing system in a healthy state. The actions may include reconfiguring the printing system to minimize use of a processing module which is predicted to fail, reserving processing modules (or components thereof) that are needed for an upcoming job from being used for jobs for which there are other processing module choices based on their current and predicted health, and the like. For example, if a particular processing module has been subject to high stress jobs, or generated a high number of prints, the FMS, acting as a health management system, may determine that an upcoming job may cause the processing module or component thereof to fail, or may distress the processing module or component (even if it does not cause it to fail). The FMS may determine that a job should be redirected around the module/component. Metrics that may be used to decide the health of a processing module or component include the possibility of failure during a subsequent or pending job (as in a prognostic system), nearness to end of life, number of prints to failure, likelihood of defects or anomalies showing up in the output (for example, likelihood of banding in the output caused by an overused corotron, likelihood of a jam in the next job) and the like. As in the case of the fault management, the FMS, when acting as a health manager, may communicate with the scheduling component 52 to effect the reconfiguration schemes that will maintain the heath of the printing system 10.

Figure 3:
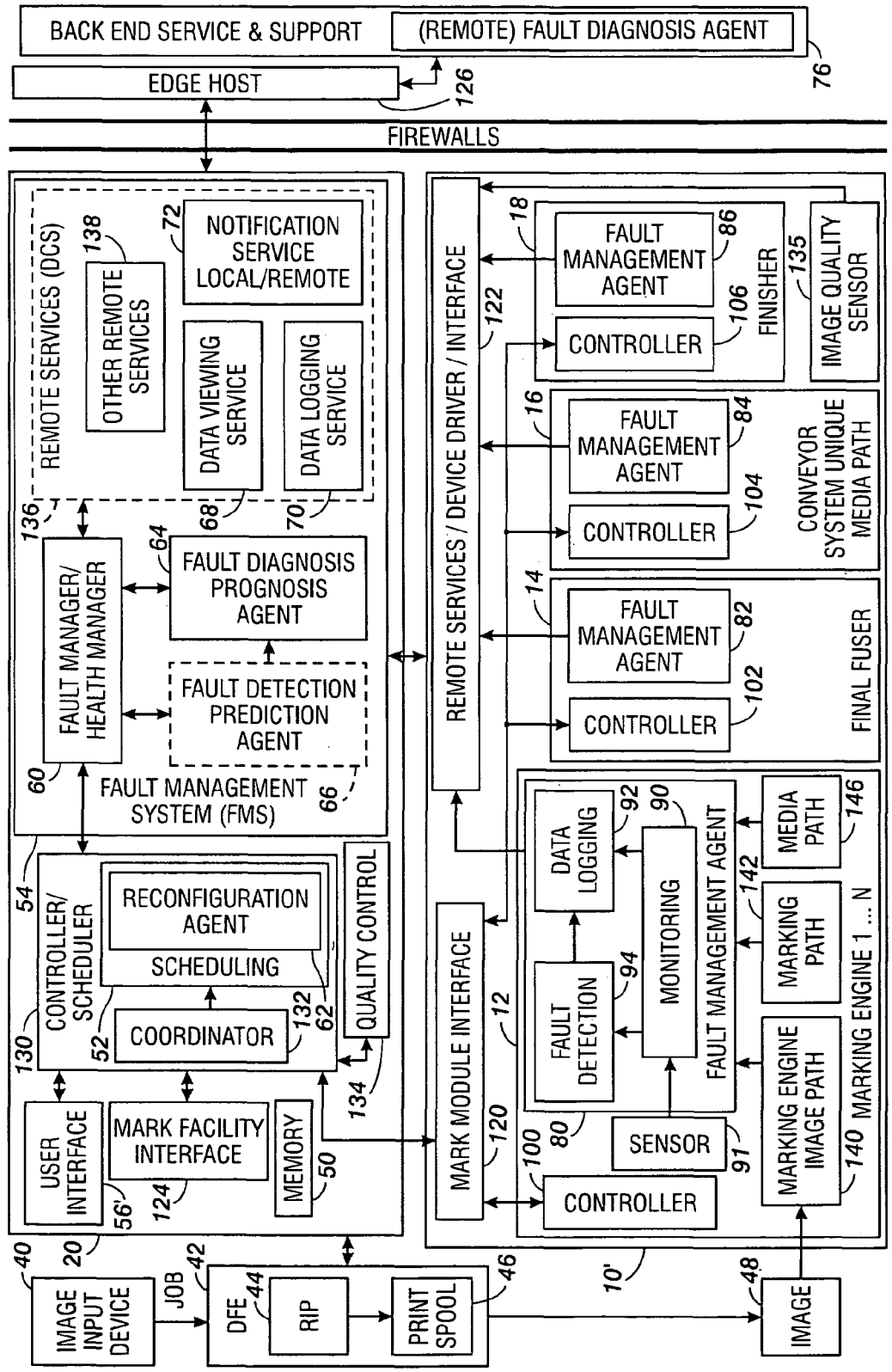
FIG. 3 is a functional block diagram of a printing system in accordance with a second aspect of the exemplary embodiment.

FIG. 3 illustrates a second embodiment of a printing system 10' which may be similarly configured to system 10, except as noted. Similar elements are accorded the same numerals and new elements are accorded new numerals. The system illustrated in FIG. 3 is designed to operate in a Device Centric Services (DCS) system of the type disclosed, for example, in above-mentioned U.S. Publication 20040111315 to Sharma, et al. Such a system provides an embedded services platform 136 for enabling system management applications and services. This allows flexible, extensible, dynamic services management, enabling networked services to be designed, added, and managed within the system without modifications to devices by incorporating one or more interfaces 120, 122, 124, e.g., between the marking engine(s) 12 and controller/scheduler 130 and between the processing modules 12, 14, 16, 18 and the fault management system 54, and between the DFE 42 and the controller/scheduler 130. Another interface (edge host) 126 may communicate between the platform 136 and the back end systems 76.

In this embodiment, the remote services platform 136 provides the data logging and data viewing facilities 68, 70, as well as notification facilities 72, both local and remote, that are part of the FMS 54. Additionally, services such as the fault manager 60, fault diagnosis agent 64, and fault detection agent 66 may also be provided by the remote services platform 136. The remote services platform also provides for remote transfer of machine data to the edge host 126 and subsequently to back end systems 76, including the external support service, to facilitate repair and remote diagnosis.

Additionally, in this embodiment, the reconfiguration agent 62 may be outside the fault management system, e.g., within the scheduling component 52 or intermediate the fault management system and the scheduling component 52. The scheduling component 52 may be integrated into a controller/scheduler 130 which provides more control over the planning and scheduling of the print jobs than in the embodiment of FIG. 1. For example, a the controller scheduler includes a coordinator 132 which communicates with the DFE 42, via mark facility interface 124, to schedule the order in which the DFE raster image processes the print jobs or pages thereof, to provide a just-in-time type of processing where print jobs or print job pages may be raster image processed after they are scheduled in the print job queue by the scheduler and just before they are due to be printed. The controller/scheduler 130 may communicate with the processing modules 12, 14, 16, 18 via the mark module interface 120. The printing system 10' also includes an image quality controller (IQC) 134 and at least one system image quality sensor 135. The image IQC acts as an image quality health monitor for the system and enables device health-based redirection, by providing an indication of how much and how often it is called upon to perform image correction for individual marking engines. The sensor 135 may sense the quality of printed image from all the marking engines (e.g., color rendering, registration of images, gloss, image defects, such as banding and streaking, etc.). The controller/scheduler 130 and/or FMS 54 may communicate with the IQC 134 to control the overall image quality of the printing system 10'. The IQC and/or FMS 54 may communicate with the image quality sensor 135 to receive sensed data. The sensor 135 may also aid the FMS in diagnosing mage quality problems in the output of the printing system 10'.

When supporting the functionalities of fault prediction and prognosis, the fault manager 60 essentially serves as a health manager for the system. In this capacity it conveys to the controller/scheduler 130 the health of the various system modules. Based on this information, the controller/scheduler can perform appropriate resource allocation and redirection.

Figure 4:
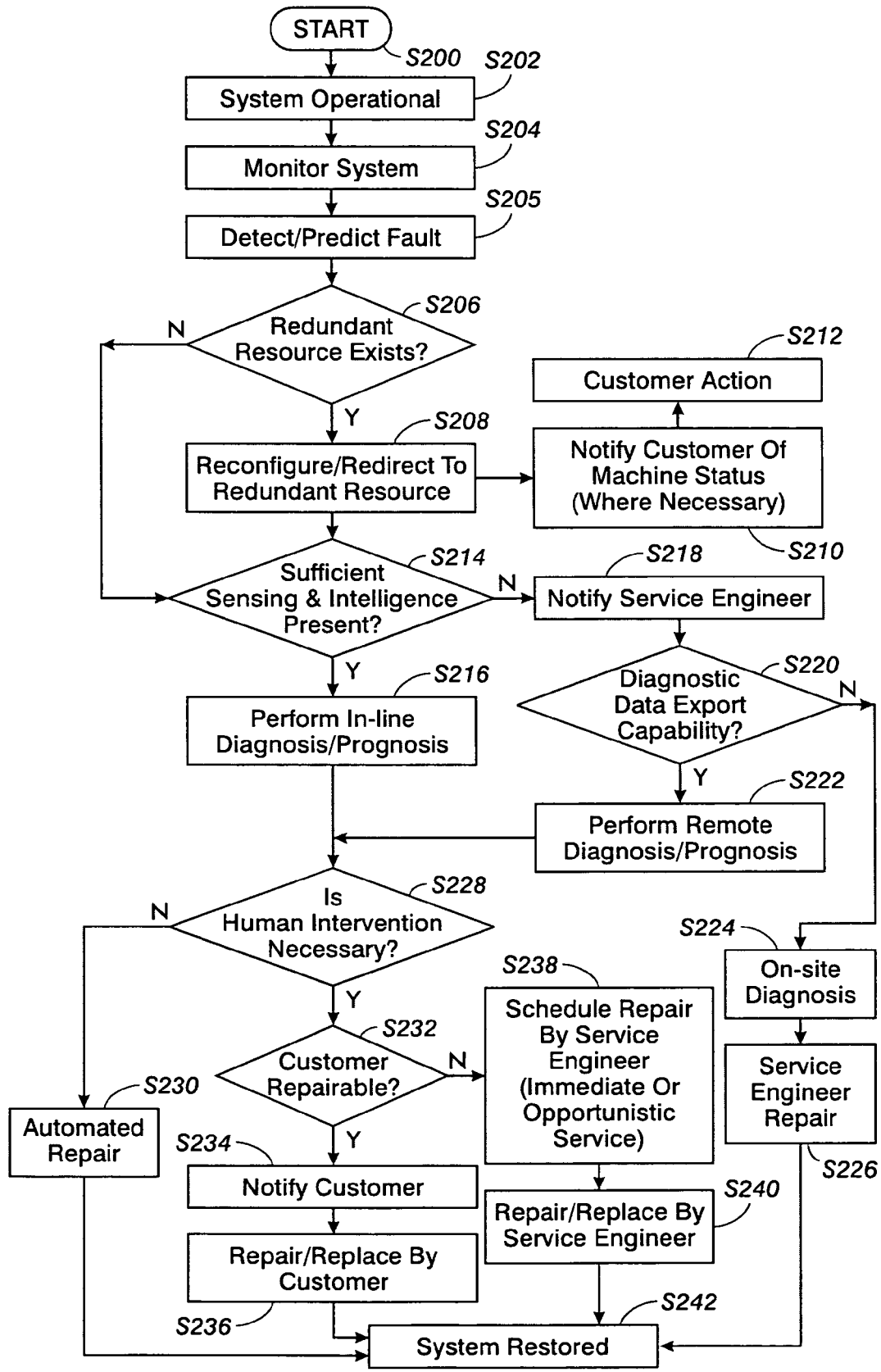
FIG. 4 illustrates an exemplary method for managing faults in a job processing system, such as the printing systems of FIGS. 1-3.

FIG. 4 illustrates an exemplary method of managing faults in a job processing system, such as the printing systems illustrated in FIGS. 1-3. It will be appreciated that the method may include fewer, more, or different steps and that the steps need not be performed in the order specified.

The method begins at S200. For purposes of discussion, it will be assumed that the job processing system 10, 10' is fully operational (S202), although in a continuously operating system, this need not be the case. At S204, the operating modules 12, 14, 16, 18 of the job processing system are monitored by their respective fault management agents and the fault related data, including sensor and actuator data, is logged. The logged data may be sent to the fault management system at this stage, where it is logged. Alternatively or additionally, the fault detection agents 80, 82, 84, 86 may perform initial fault detection and/or diagnosis and the processed data may be sent to the FMS. At S205, the fault management system 54, using data from one or from multiple processing modules, detects an existing fault or predicts that a fault will occur in one of the operational modules 12, 14, 16, 18. It should be noted that the fault detection at this stage may be relatively unsophisticated, providing sufficient information only to support the redirection. The detection may be too limited at this stage to provide sufficient information for performing an appropriate repair action.

At S206 the reconfiguration agent 62 determines if a redundant resource exists. If so, the reconfiguration agent reconfigures the job processing system based on the redundant resources (S208). Depending on the reconfiguration, jobs to be processed by the processing modules may be redirected to one or more redundant resources. The redirection may result in a partial productivity mode, a partial capability mode, or may have no impact on the productivity or capability of the system based on the level and type of redundancy present. In a partial productivity mode, the faulty module may be isolated. In a partial capability mode, the faulty module may be isolated or may continued to be used, albeit with loss of some capabilities or functionalities. Examples of failures that cause partial productivity modes in marking engines include print path faults, paper jams, replacements of high frequency service items, such as cleaner blades, corotrons, and the like, media resources required (e.g., a particular type of paper has run out), customer replaceable unit (CRU) replacement is needed (e.g., scheduled photoreceptor belt replacement is due, etc), and consumable replacement is needed (e.g. toners or ink cartridges have run out). Examples of partial capability modes in marking engines include those resulting in partial color capability (e.g., monochrome only), and capability for printing only less stressful jobs (e.g., text only, low area coverage, less stressful media, or lower gloss requirements).

At step S210, the customer or other operator may be notified of the machine status, which may result in a customer action (S212). Whether or not redundant resources exist, the method proceeds to S214.

At S214, the fault management system determines whether sufficient sensing and processing capabilities exist in the fault reporting processing module(s) or in the fault management system itself for more detailed fault diagnosis. If so, the fault management system may perform diagnosis/prognosis on the logged data (S216). If not, the fault management system may notify a service engineer or remote fault diagnosis agent, for example, via the notification service 72 (S218). The service engineer/remote diagnosis agent may request export of data from the job processing system. If this capability exists (S220), the service engineer or remote diagnosis agent performs remote diagnosis on the exported data and communicates a diagnosis/prognosis to the fault management system 54 (S222). In the event that there is no capability for exporting data, or the data is insufficient for a remote diagnosis, an on-site diagnosis may be performed by the service engineer (S224), which may result in a repair (S226).

The diagnosis (step S216) may run as a background service while the system continues to operate with alternate deployed resources. In addition to the error and exception data used by the fault detection service, the diagnosis service may use detailed sensor and actuator information to identify the actual problem source. The detailed diagnosis serves to diagnose accurately the source of the fault, e.g., by identifying an individual replaceable unit as faulty, enabling appropriate service action to be taken. In this way, human intervention may be limited to the repair or replacement of a single faulty processing module component. The diagnosis also helps to validate and augment the results of the fault detection service 66 and thereby mitigate the effects of false positives and false negatives in detection. In other words, if an isolated unit is found to be indeed faulty after detailed diagnosis, the system may continue to operate with the newly deployed resources; whereas, if it is found to be fully functional after all, the (wrongly) isolated unit can be put back in service.

If automated diagnosis by the fault management system or remote diagnosis determines that human intervention is not necessary at S228, an automated repair may be performed (S230). This may include resetting actuators for the operational components (e.g., adjusting fuser operating temperatures, electrical power to the charging corotron or transfer corotron, adjusting nip roller speeds or nip gaps, and the like), adjusting tone reproduction curves, etc to remove the fault or to mask defects caused by the fault. In the case where human intervention is determined to be required, at S232, the fault management system may determine whether the fault is customer repairable or requires a service engineer. If the fault is determined to be customer repairable, at S234, the customer is notified. The customer (or other local user) may effect a repair, e.g., by replacement of a CRU, or other perform other repair based on specific information as to the determined root cause of the fault (S236). If the fault management system determines that the fault is not customer repairable, it may schedule a repair by a service engineer (S238), who may effect a repair (S240). This repair action may be scheduled immediately following the failure or at an opportune time based on customer preferences and/or economics. The system is restored to its operational state (S242) through repairs made at step S230, S236, S240. The method may continue to S202.

As will be appreciated, the fault management system, through more accurate fault detection and diagnosis, reduces the proportion of repairs requiring a service engineer, thereby reducing running costs as well as maintaining a higher system productivity. The fault management system may also reduce the service time of the service engineer, since the engineer is directed to the specific fault and thus may be able to replace/repair fewer components. The need for a service call may be eliminated in some cases by automated repair/replacement or by enabling the customer/operator to perform this action. This is improved by providing appropriate customer self-maintenance instructions and CRUs. Additionally, wherever possible replacement units are replacable without shutting down the operational module, thus enabling continued system operation even during repair. The fault management system also enables the printing system to continue running, despite a fault, by appropriately reconfiguring the system resources until the repair is effected. Thus, the FMS not only maintains high availability and productivity but also reduces running costs.

The method illustrated in FIG. 4 may be implemented in a computer program product that may be executed on a computer. The computer program product may be a tangible computer-readable recording medium on which a control program is recorded, or may be a transmittable carrier wave in which the control program is embodied as a data signal.

The exemplary printing systems thus described provide a strategy for fault management in high availability printing systems as well as an architecture of the fault management system that supports such a strategy and allow extension of the fault management into heath management of the printing system.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A printing system comprising:
a plurality of print media processing modules which transfer print media therebetween during printing, a fault management agent associated with each of the modules for acquiring fault-related data from the respective processing module, each fault management agent including a data logging component comprising memory for logging sensed information and a fault detection unit for providing preliminary analysis of the logged information, the preliminary analysis including detection of a fault in the respective processing module; and
a fault management system in communication with the fault management agents which receives fault-related data from the fault management agents, the fault management system processing the fault related data from the fault management agents to identify faults in the printing system.

2. The printing system of claim 1, further comprising a reconfiguration agent for reconfiguring the printing system to mitigate an impact of at least one of the identified faults.

3. A printing system comprising:
a plurality of print media processing modules which transfer print media therebetween during printing;
a fault management agent associated with each of the modules for acquiring fault-related data from the respective processing module; and
a fault management system in communication with the fault management agents which receives fault-related data from the fault management agents, the fault management system processing the fault related data from the fault management agents to identify faults in the printing system, the fault management system executing instructions for identifying at least one of the following faults:
a fault which originates in a first of the processing modules which is a cause of fault-related data acquired in a second of the processing modules;
a fault which originates in a first of the processing modules which lacks sufficient diagnostic capabilities for detecting the fault;
a fault which is caused by more than one processing module; and
a fault which arises from interactions between processing modules.

4. The printing system of claim 1, wherein the fault management system processes the fault related data to identify when a first of the processing modules is a cause of fault-related data acquired in a second of the processing modules.

5. The printing system of claim 1, further comprising a scheduling component in communication with the fault management system, which schedules processing of the print media by the processing modules, the scheduling component optionally being configured for utilizing available redundancy in the printing system to modify usage of a first of the processing modules when the first processing module is identified as a cause of fault-related data acquired by a second of the processing modules.

6. The printing system of claim 5, wherein the available redundancy is provided by at least one of the second processing module and third processing module having similar processing functionality to the first processing module.

7. The printing system of claim 1, wherein a first of the processing modules comprises a marking engine.

8. The printing system of claim 7, wherein a second of the processing modules is downstream of the first processing module and receives print media from the first processing module.

9. The printing system of claim 1, wherein the processing modules are independently selected from the group consisting of marking engines, a conveyor system, secondary fusers, and finishers.

10. The printing system of claim 1, wherein the processing modules include at least one marking engine, a conveyor system, and a finisher.

11. The printing system of claim 1, further comprising at least one user interface selected from:
a user interface, in communication with a scheduling component, for inputting user preferences to the scheduling component; and
a user interface, in communication with the fault management system, for inputting faults in the printing system identified by the user.

12. The printing system of claim 1, further comprising at least one of:
a remote services notification system, for communicating the fault-related data to a remote service having at least one of fault diagnosis capability and repair capability;
a user notification system for notifying a user of an identified fault.

13. The printing system of claim 1, further comprising at least one sensor, in communication with fault management system, which senses attributes selected from the group consisting of processing module attributes, print media attributes, image quality attributes, and combinations thereof and generates fault-related data therefrom.

14. The printing system of claim 13, wherein at each of the processing modules includes a fault management agent, in communication with the fault management system and with the sensor, for communicating fault related data acquired for the processing module to the fault management system.

15. The printing system of claim 14, wherein the sensor senses image quality attributes, the printing system further comprising an image quality controller, which cooperates with the fault management system to identify image quality faults.

16. The printing system of claim 1, wherein the fault management system, performs at least one of the following:
diagnosing an identified fault while the printing system is running in one of a full productivity mode, a partial productivity mode, a partial capability mode, and a diagnostic mode;
requesting one of the processing modules to perform diagnostic tests;

requesting one of the processing modules to at least one of shut itself down, temporarily change its capabilities, and modify its operating parameters;

functioning as a health management system that uses data on actual or impending failures along with usage history and failure history of printing system components and determines appropriate actions to maintain the overall health of the system including reconfiguring the printing system to reduce use of components which are likely to fail and reserving selected components for future use.

17. A method for management of faults in a printing system comprising:

acquiring fault-related data by a plurality of fault management agents, each of the fault management agents being associated with a print media processing module in the printing system, the print media processing modules transferring print media therebetween during printing;

communicating the fault-related data to a fault management system;

processing the fault-related data to identify faults that exist in the printing system; and reconfiguring the printing system to mitigate an impact of at least one of the identified faults.

18. The method of claim 17, wherein the identifying of faults includes at least one of:

identifying a fault which originates in a first of the processing modules which is a cause of fault-related data acquired in a second of the processing modules;

identifying a fault which originates in a first of the processing modules which lacks sufficient diagnostic capabilities for detecting the fault;

identifying a fault which is caused by more than one processing module; and identifying a fault which arises from interactions between processing modules.

19. The method of claim 17, further comprising acquiring data from an image quality controller and wherein the processing includes processing the data acquired from the image quality controller to identify image quality faults in the printing system.

20. A method for management of faults in a job processing system comprising:

acquiring first fault-related data from a first processing module in a job processing system;

acquiring second fault-related data from a second processing module in the job processing system; and processing a combination of the acquired first and second fault related data to identify when a first of the processing modules is a cause of fault-related data acquired in a second of the processing modules.

21. The method of claim 20, wherein the job processing system comprises a printing system.

22. The method of claim 20, wherein the acquiring of fault-related data from a plurality of processing modules comprises acquiring fault related data from a plurality of marking engines.

23. The method of claim 20, further comprising:

scheduling processing of a job by the processing modules, the scheduling reducing usage of the first processing module when the first processing module is identified as the cause of the fault-related data acquired by the second processing module.

24. The method of claim 20, further comprising:

reconfiguring the job processing system when the first processing module is identified as the cause of the fault-related data acquired by the second processing module, the reconfiguring including at least one of:

redirecting job processing by the first processing module to a second processing module;

modifying the first processing module to correct the fault;

selecting a media source to mitigate an impact of the fault;

reducing usage of the first processing module; and instructing at least one of the processing modules to modify operating parameters of the least one processing module.

25. The method of claim 20, further comprising:

notifying at least one of a user and a remote service when the first processing modules is identified as a cause of fault-related data acquired in a second of the processing modules.

26. The method of claim 20, wherein the processing of the combination of the acquired first and second fault related data comprises submitting the first and second fault-related data to a remote fault diagnostic agent configured for diagnosing faults in the first and second processing modules.

27. A tangible computer readable recording medium which includes instructions for performing the method of claim 20.

28. A printing system comprising:

a plurality of print media processing modules which transfer print media therebetween during printing; and a fault management system comprising:

a plurality of fault management agents, each acquiring fault-related data for identifying faults in a respective print media processing module;

a fault detection agent which analyses fault-related data from the plurality of fault management agents;

a fault diagnosis agent which identifies when a first of the processing modules is a source of a fault detected by a second of the processing modules, based on the analyzed fault-related data; and a reconfiguration agent which reconfigures the integrated system to modify usage of the first processing module when the fault diagnosis agent identifies the first processing module as the source of a fault.

* * * * *